Patented Sept. 14, 1948

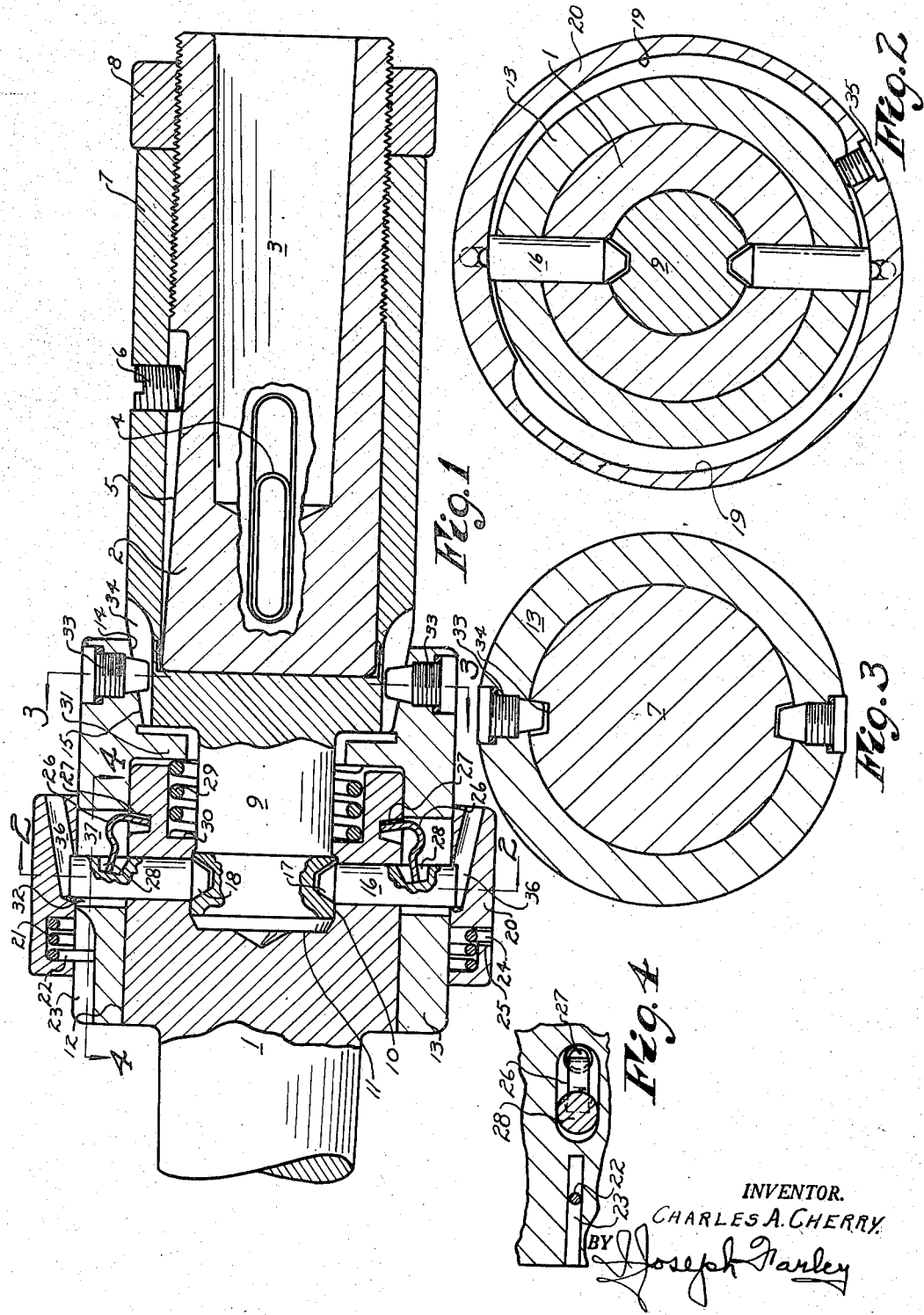

2,449,277

UNITED STATES PATENT OFFICE 2,449,277

QUICK LOCK TOOLHOLDER

Charles A. Cherry, Berkley, Mich., assignor to Beaver Tool & Engineering Corp., Royal Oak, Mich., a corporation of Michigan Application October 8, 1945, Serial No. 621,107

9 Claims. (Cl. 279—81)

This invention relates to tool holders and more particularly to holders for rotary cutting tools.

In adapting cutting tools to the rotary spindle of a machine, the practice of utilizing one or more sets of tapered sleeves and shanks has become almost universal. The gradual taper serves to center the tool, hold it firmly in position and act as a driving means for transmitting the torque from the spindle to the tool. However, where frequent exchange of cutting tools is required, the use of this method alone has certain limitations which the present invention is directed to overcome.

Due to the gradual taper of the sleeve and shank, a slight difference in pressure in reinserting a tapered shank may cause a substantial variation in the longitudinal position in which the tool will come to rest, and consequently, a tool may not be consistently disengaged and re-engaged in exactly the same longitudinal position. Where close tolerances must be held in the depth of drilling, milling or boring operations, it is therefore necessary each time a tool is re-engaged to gage a starting cut before the depth of cut can be accurately set on the feed controls of the machine.

A further objection to the conventional system of tool holder lies in the necessity of using a drift and hammer to disengage a tapered shank from its sleeve. Such operation is both time consuming and clumsy, frequently resulting in tool breakage where care is not taken to prevent the tool from falling.

Where a cycle of two or more operations on the same machine requires the use of different cutting tools and the cycle of operations is to be repeated in one or more parts, it is apparent that means for re-engaging each cutting tool in exactly the same longitudinal position would permit accurate and consistent depth of cut without the necessity of gaging starting cuts each time a tool is re-engaged, thereby permitting full advantage to be taken of the automatic feed controls of the machine as well as facilitating accurate work on volume production by inexperienced operators. It is also apparent that a means of quickly releasing a tool that may be accomplished by the hands of the operator without the use of other instruments is highly advantageous where repeated disengagement and re-engagement of the cutting tool is required.

In order to supply the need for such means, precise longitudinal positioning and a method of quick release has been previously accomplished as disclosed in U. S. Letters Patent No. 2,279,899, granted to Charles A. Cherry. In the latter invention a tool holder socket was provided with a cylindrical bore adapted to receive the generally cylindrical shank of a cutting tool or cutting tool holder and through means of a wedging key, exact longitudinal positioning of the shank was accomplished. Quick release of the tool or tool holder was accomplished by a locking sleeve, rotatable by hand, the internal camming surfaces of which actuated the wedging key.

The principal object of the present invention is to provide an improved means of accomplishing exact longitudinal repositioning of a cutting tool upon successive disengagement and re-engagement thereof.

Another object of the invention is to provide an improved tool holder with a readily detachable member permitting the rapid exchange of various cutting tools for successive machining operation.

A further object of the invention is to provide a rigid construction for supporting the detachable members that will utilize the centering and supporting advantages of a tapering sleeve and shank and at the same time permit exact longitudinal positioning of said member.

Still another object of this invention is to provide a spring actuated locking sleeve which, during operation, will urge the locking members into firm engagement.

A still further object of the invention is to provide an automatic means for unlocking the detachable member upon manual rotation of a locking sleeve.

Another object of the invention is to provide a centrifugally balanced tool holder that will overcome any tendency to vibrate during operation.

These and other objects will appear more fully from the following description and by reference to the accompanying drawing wherein Fig. 1 is a central longitudinal section through the holder;

Fig. 2 is a sectional view thereof taken along the line 2—2 of Fig. 1;

Fig. 3 is a sectional view thereof taken along the line 3—3 of Fig. 1; and

Fig. 4 is a fragmentary sectional view thereof taken along the line 4—4 of Fig. 1.

The socket 1, the tool holder sleeve 13 and locking sleeve 20 are assembled together to form a unitary assembly which is supported within and driven by the tool spindle of the machine tool with which the tool holder is to be used by the engagement of the tapered shank and tang (omitted from the drawing) of the member 1 within the corresponding shaped bore with which the spindle of the machine tool is customarily provided. In assembling these parts, the spring 29 is first placed within the counterbore formed in the right hand or outward end of the socket 1. The sleeve 13 is then slipped over the cylindrical extension 12 of the socket 1 until the slots in the sleeve 13 provided for the locking pins 16 are in alignment with the holes for such pins provided in the cylindrical extension 12. The relative positioning of such slots and holes is such that it is necessary to compress the spring 29 in order to bring the slots and holes in alignment. The pins 16 with their retracting springs 26 are then slipped into position and held to press against the action of the springs 26, while the locking sleeve 20 having the tortion spring 21 placed in position therein is slipped over the sleeve 13, the locking sleeve 20 being rotated so as to engage the end 22 of the tortion spring within the slot 23 in such a way as to place the spring 21 under tortion such as will normally cause the locking sleeve 20 to be rotated in a clockwise direction (Fig. 2), so as to normally cause the cam surfaces 19 of the locking sleeve 20 to urge the pins 16 inwardly against the action of the springs 26.

It will be noted that the conical recesses 18, within the cylindrical shaft extension 9 of the tool adapter sleeve 7, are spaced from the end 11 of such shaft a distance such that when the tapered ends 17 of the pins 16 engage within the said conical recesses 18, the end 11 will be held firmly in contact with the bottom of the cylindrical recess 10 by the wedging action between the tapered ends 17 of the pins and the conical recesses and the wedging action of the sam surfaces 19 when the tool adapter sleeve 7 is inserted within the assembly consisting of the tool holder socket 1, the tool holder sleeve 13 and the locking sleeve 20.

As the end 11 of the cylindrical extension of the tool adapter sleeve 7 is always held in tight contacting abutting relationship against the bottom of the cylindrical recess 10 in the tool holder socket 1, the tool adapter sleeve 7 will, therefore, always be maintained in the same position considered longitudinally of the tool to be driven thereby. The sleeve 13 will normally be urged by the action of the compression spring 29 to the right or outwardly from the spindle of the machine to the limit of the clearance 32 provided by the longitudinally elongated slots 37 in the sleeve 13 through which the pins 16 pass. The tapered surfaces 14 and 15 of the tool adapter sleeve 7 and the sleeve 13 are so machined that, when the tool adapter sleeve is engaged within the socket assembly, such surfaces will come into contacting engagement before the end 11 of the cylindrical extension 12 comes into abutting engagement with the bottom of the cylindrical recess 10. Due to the amount of clearance 32 provided in the slots 37 in the sleeve 13 through which the pins 16 project, considerable tolerance may, therefore, be allowed in the machining of the tapered surfaces 14 and 15.

In the operation of the device, drive is imparted to the tool holder socket 1 through the conventional taper and tang engagement of the latter with the machine tool spindle. Drive is then imparted to the sleeve 13 by the engagement of the pins 16 within the elongated slots in sleeve 13 through which the pins 16 extend. The sleeve 13 in turn drives the tool adapter 7 through the engagement of the ends of the screws 33 with the longitudinal slots 34 in the tool adapter 7. As the end 11 of the cylindrical extension 12 of the tool adapter 7 is held in firm contacting engagement with the bottom of the cylindrical recess 10 by the wedging action of the pins 16 and cam surfaces 19 and, as the compression spring 29 abuts at its inner end against the shoulder 30 of the tool socket 1 and said spring engages at its outward end with the shoulder provided by the inwardly extending flange 31 of the sleeve 13, the sleeve 13 will always be urged outwardly so that the tapered surface 15 thereof will be held in snug contacting engagement with the tapered surface 14 of the tool adapter 7.

Within the partially threaded bore at the outer end of the adapter 7 an intermediate adapter 2 is provided, being held securely in position by a lock screw 6 engaged in the tapered slot 5 and by a lock nut 8 tightened against the end of the adapter 7. The cutting tool shank or holder, not shown, is received within the tapered bore 3 and may be removed by the use of a drift pin accommodated by the tapered slot 4 passing through both the adapter 7 and intermediate adapter 2.

From the foregoing, it will thus be seen that a tool holder made in accordance with the principle of the present invention embodies the advantage of a positive location of a tool carried by the tool adapter sleeve 7 in identically the same position in the longitudinal direction of the tool movement within very precise, accurate and close tolerances so that repeated machining operations of similar workpieces to a desired depth of cut may be held within the limits of accuracy of the automatic feed mechanism of the machine tool. At the same time, the known advantages of the use of a tapered engagement between the tool and tool holder are obtained without the necessity of maintaining very close tolerances in the machining of such tapered surfaces 14 and 15, which would require very difficult and costly machining operations.

Quick release of the locking pins is accomplished by a simple twist of the locking sleeve, whereupon the tool adapter sleeve may be readily removed. The spring actuated rotation of the locking sleeve in the direction required to urge the locking pins into firm engagement eliminates any possibility of vibration causing the pins to loosen. The tool adapter sleeve is firmly held in axial alignment and in a positive longitudinal position through the engagement of the end of the shaft 9 with the recess in the tool holder socket 1 combined with the tapered centering and supporting thrust of the tool holder sleeve 13 against the tool adapter sleeve 7. This arrangement combines for the first time the centering and supporting advantages of the tapered shank and sleeve together with the longitudinally locating advantages of abutting surfaces perpendicular to the axis of rotation.

Centrifugal balance of the holder is accomplished throughout the construction through the use of radially opposed locking and driving pins as well as the use of conical supporting surfaces.

It is the preferred practice of the applicant to provide a tool adapter sleeve for each of the various cutting tools required to complete the operations on a given part. This permits the rapid disengagement of each tool as its operation is completed and the engagement of other tools required for successive operations. Each tool may then be "set up" only once for the operation it is to perform and, when such operation is repeated on the same or other parts, exact longitudinal positioning of the cutting tool and depth of cut is assured within the limits of accuracy of the feed mechanism of the machine. Thus an inexperienced operator may rapidly machine as many parts as is possible between tool grinding operations with a minimum danger of machining errors in the depth of cut.

While a preferred form of the invention is illustrated and described above, it is to be understood that numerous modifications and adaptations may be made without departing from the spirit thereof as defined in the claims.

I claim:

1. A tool holder comprising a member adapted to be held and driven by the rotary spindle of a machine, an adapter having means to receive and hold the shank of a cutting tool or cutting tool holder, and intermediate means for engaging and disengaging and for rigidly holding the adapter in a fixed longitudinal position and in axial alignment with respect to said member characterized by the combination of an abutting and axially positioning contact between adjacent ends of said member and adapter whereby exact longitudinal and axial relationship therebetween is established and a further means for centering and supporting said adapter comprising a tapered conical surface in said adapter spaced longitudinally from the said abutting and axially positioning contact, means for mounting on said member in fixed axial alignment therewith but with freedom to move longitudinally thereon a sleeve with a tapered conical surface for engaging the first-mentioned tapered conical surface, and means for urging the tapered conical surface of said sleeve into centering and supporting engagement with said adapter.

2. A tool holder comprising a member adapted to be held and driven by the rotary spindle of a machine, an adapter having means to receive the shank of a cutting tool or cutting tool holder, and intermediate means for engaging and disengaging and for rigidly holding the adapter in a fixed longitudinal position and in axial alignment with respect to said member characterized by the combination of an abutting and axially positioning contact between adjacent ends of said member and adapter whereby exact longitudinal and axial relationship therebetween is established and a further means for centering and supporting the adapter comprising a tapered conical surface on said adapter located longitudinally outward from the said abutting and axially positioning contact, means for mounting on the first-mentioned member in fixed axial alignment therewith but with freedom to move longitudinally thereon a sleeve provided with a tapered conical surface for cooperating contact with the said tapered surface on the adapter, and means for urging the said sleeve into centering and supporting engagement with said adapter.

3. A tool holder comprising a member having means adapted to be engaged with and driven by a spindle of a machine tool, an adapter having means for holding a cutting tool, said member and adapter being provided with cooperating surfaces for insuring a positive positioning of said adapter longitudinally and radially relative to said tool spindle upon successive disengagement and re-engagement of said adapter with said member, a sleeve nonrotatably but longitudinally slidably mounted upon said member, said sleeve and adapter being provided with cooperating tapered surfaces spaced longitudinally from said first-mentioned surfaces, means for wedging said first-named surfaces in contacting abutting engagement and means for urging said sleeve longitudinally outwardly of said member to hold the cooperating tapered surfaces of said sleeve and adapter in tight wedging engagement.

4. A tool holder comprising a member having means adapted to be engaged with and driven by a spindle of a machine tool, an adapter having means for holding a cutting tool, said member and adapter being provided with cooperating surfaces for insuring a positive positioning of said adapter longitudinally and radially relative to said tool spindle upon successive disengagement and re-engagement of said adapter with said member, a sleeve nonrotatably but longitudinally slidably mounted upon said member, said sleeve and adapter being provided with cooperating tapered surfaces spaced longitudinally from said first-mentioned surfaces, means for wedging said first-named surfaces in contacting abutting engagement, said means comprising a plurality of radially movable locking pins for engagement with said adapter and cam means for holding said pins in locking position, and means for urging said sleeve longitudinally outwardly of said member to hold the cooperating tapered surfaces of said sleeve and adapter in tight wedging engagement.

5. A tool holder comprising a member having means adapted to be engaged with and driven by a spindle of a machine tool, an adapter having means for holding a cutting tool, said member and adapter being provided with cooperating surfaces for insuring a positive positioning of said adapter longitudinally and radially relative to said member upon successive disengagement and re-engagement of said adapter with said member, a sleeve nonrotatably but longitudinally slidably mounted upon said member, said sleeve and adapter being provided with cooperating tapered surfaces spaced longitudinally from said first-mentioned surfaces, means for wedging said first-named surfaces in contacting abutting engagement, said means comprising a locking sleeve rotatably mounted on said first sleeve, a plurality of radially movable locking pins, said locking sleeve being provided with cam means for engaging said pins and wedging them into engagement with said adapter, and means for urging said sleeve longitudinally outwardly of said member to hold the cooperating tapered surfaces of said sleeve and adapter in tight wedging engagement.

6. A tool holder comprising a member having means adapted to be engaged with and driven by a spindle of a machine tool, an adapter having means for holding a cutting tool, said member and adapter being provided with cooperating surfaces for insuring a positive positioning of said adapter longitudinally and radially relative to said member upon successive disengagement and re-engagement of said adapter with said member, a sleeve mounted upon said member in axial alignment therewith but free to move longitudinally thereupon, said sleeve and adapter being provided with cooperating tapered surfaces spaced longitudinally from said first-mentioned surfaces, means for locking said first-named cooperating surfaces in contacting abutting engagement, and means for urging said sleeve longitudinally to hold the said cooperating tapered surfaces of said sleeve and adapter in tight wedging engagement comprising a shoulder in the first-mentioned member, an internal flange in said sleeve, and a coiled spring mounted under compression therebetween.

7. A tool holder comprising a member having means adapted to be engaged with and driven by a spindle of a machine tool, an adapter having means for holding a cutting tool, said member and adapter being provided with cooperating surfaces for insuring a positive positioning of said adapter longitudinally and radially relative to said member upon successive disengagement and re-engagement of said adapter with said member, a sleeve nonrotatably but longitudinally slidably mounted upon said member, said sleeve and adapter being provided with cooperating tapered surfaces spaced longitudinally from said first-mentioned surfaces, means for wedging said first-named surfaces in contacting abutting engagement, said means comprising a locking sleeve rotatably mounted on said first sleeve, a plurality of radially movable locking pins, said locking sleeve being provided with cam means for engaging said pins and wedging them into engagement with said adapter, means for urging said sleeve longitudinally outwardly of said member to hold the cooperating tapered surfaces of said sleeve and adapter in tight wedging engagement, and means for transmitting torque from the member engaged by the spindle to the adapter comprising said locking pins, said nonrotatably but slidably mounted sleeve, driving pins located at the outward end of said sleeve, and longitudinally elongated slots in the adapter for engaging said driving pins, said elongated slots being formed to permit relative longitudinal movement between said sleeve and said adapter but to prevent relative rotation therebetween.

8. A tool holder comprising a member having means adapted to be engaged with and driven by a spindle of a machine tool, an adapter having means for holding a cutting tool, said member and adapter being provided with cooperating surfaces for insuring a positive positioning of said adapter longitudinally and radially relative to said member upon successive disengagement and re-engagement of said adapter with said member, a sleeve nonrotatably but longitudinally slidably mounted upon said member, said sleeve and adapter being provided with cooperating tapered surfaces spaced longitudinally from said first-mentioned surfaces, means for wedging said first-named surfaces in contacting abutting engagement, said means comprising a locking sleeve rotatably mounted on said first sleeve, a plurality of radially movable locking pins, said locking sleeve being provided with cam means for engaging said pins and wedging them into engagement with said adapter, means for urging said sleeve longitudinally to hold the cooperating tapered surfaces of said sleeve and adapter in tight wedging engagement, said means comprising a shoulder in the member on which the sleeve is slidably mounted, an annular internal flange in the sleeve, and a spring mounted under compression between said shoulder and said flange, and means for transmitting torque from the member engaged by the spindle to the adapter comprising said locking pins, said nonrotatably but slidably mounted sleeve, driving pins located at the outward end of said sleeve, and longitudinally elongated slots in the adapter for engaging said driving pins, said elongated slots being formed to permit relative longitudinal movement between said sleeve and said adapter but to prevent relative rotation therebetween.

9. A tool holder comprising a member having a tapered shank and tang adapted to be engaged with and driven by the spindle of a machine tool, an adapter having conventional means for holding a cutting tool, said member and adapter being provided with cooperating surfaces substantially perpendicular to the axis of rotation of the holder for insuring a positive positioning of said adapter longitudinally relative to said member and said tool spindle upon successive disengagement and re-engagement of said adapter with said member, said member and adapter being also provided with cooperating male and female surfaces of substantially cylindrical form having axes coinciding with the said axis of rotation for insuring axial alignment of the end of said adapter adjacent to said member with the axis of said member, a sleeve mounted upon said member nonrotatably and in axial alignment therewith but longitudinally slidable thereon, said sleeve and said adapter being provided with cooperating tapered surfaces spaced longitudinally from said male and female cylindrical surfaces, means for wedging and locking said first-mentioned perpendicular surfaces into contacting abutting engagement, said means comprising a locking sleeve rotatably mounted on said first sleeve and being provided with a plurality of internal cam surfaces, a plurality of radially movable locking pins passing through said first sleeve for contact with said cam surfaces, said locking pins and said adapter being provided with cooperating tapered surfaces such that the radially inward movement of said pins urges the adapter into abutting engagement with said first member, a torsion spring one end of which engages with the locking sleeve and the other end with said first sleeve and mounted so as to normally urge rotation of the locking sleeve in a direction causing the cam surfaces thereof to urge said locking pins radially inward, each of said locking pins being provided with a spring one end of which is anchored to the first said member for urging the said pins radially outward out of locking position upon rotation of the said locking sleeve against the said torsion spring, means for urging said first sleeve longitudinally outwardly of said member to hold the cooperating tapered surfaces of said sleeve and adapter in tight wedging engagement comprising a shoulder in the first mentioned member, a longitudinally opposed internal flange in said sleeve, a coiled spring mounted under compression therebetween, and a plurality of longitudinal slots in said sleeve to permit longitudinal movement of said sleeve with respect to said locking pins, means for transmitting torque from said first member to said adapter comprising a plurality of driving pins mounted in said first sleeve, a plurality of elongated slots provided in said adapter for engaging said driving pins, said elongated slots being formed to permit relative longitudinal movement between said sleeve and said adapter but to prevent relative rotation therebetween, rotational engagement of said first member with said locking pins, locking pins with said first sleeve, first sleeve with said driving pins, and driving pins with said adapter.

CHARLES A. CHERRY.

REFERENCES CITED

The following references are of record in the file of this patent:

UNITED STATES PATENTS

| Number | Name | Date |
| --- | --- | --- |
| 1,024,172 | Bergsten | Apr. 23, 1912 |
| 2,170,610 | Shutz | Aug. 22, 1939 |
| 2,345,884 | Powers et al | Apr. 4, 1944 |